United States Patent
An et al.

(10) Patent No.: US 8,028,525 B2
(45) Date of Patent: Oct. 4, 2011

(54) MULTISTAGE EXHAUST TURBOCHARGER (75) Inventors: Byeongil An, Kanagawa (JP); Takashi Shiraishi, Kanagawa (JP); Toru Kikuchi, Kanagawa (JP); Mamoru Wakita, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 697 days.

(21) Appl. No.: 11/989,709

(22) PCT Filed: Aug. 3, 2007

(86) PCT No.: PCT/JP2007/065671
§ 371 (c)(1),
(2), (4) Date: Mar. 5, 2008

(87) PCT Pub. No.: WO2008/018574
PCT Pub. Date: Feb. 14, 2008

(65) Prior Publication Data
US 2009/0031722 A1    Feb. 5, 2009

(30) Foreign Application Priority Data

Aug. 10, 2006  (JP) ................................. 2006-218094

(51) Int. Cl.
| F02B 33/44 | (2006.01) |
| F02B 37/013 | (2006.01) |
| F02B 37/00 | (2006.01) |
| F02B 37/16 | (2006.01) |
| F02D 23/00 | (2006.01) |
| F16K 15/00 | (2006.01) |
| F16K 1/00 | (2006.01) |
| F16K 51/00 | (2006.01) |
| F16K 31/00 | (2006.01) |

(52) U.S. Cl. ......... 60/612; 60/605.1; 123/562; 137/527; 137/875; 251/152; 251/64

(58) Field of Classification Search ................. 60/605.1, 60/611, 612, 323; 123/562; 415/144; 137/527, 137/875, 339, 535; 251/152, 64
See application file for complete search history.

(56) References Cited

U.S. PATENT DOCUMENTS
5,137,003 A * 8/1992 Kyoya et al. .................... 60/611
(Continued)

FOREIGN PATENT DOCUMENTS
DE    102007062366 A1 *  6/2009
(Continued)

OTHER PUBLICATIONS
Korean Office Action issued Sep. 29, 2009 in corresponding Korean Application No. 2008-7002681 w/English translation.

Primary Examiner — Thai Ba Trieu
(74) Attorney, Agent, or Firm — Wenderoth, Lind & Ponack, L.L.P.

(57) ABSTRACT

A multistage exhaust turbocharger is easily mountable in a narrow engine compartment of a vehicle by simplifying its construction and reducing its bulk. The multistage exhaust turbocharger has a high-pressure stage turbocharger and a low-pressure stage turbocharger. A cover of the high-pressure stage turbocharger has a compressor inlet passage, a bypass inlet passage, a switching aperture between the passages to be opened and closed by a valve body of the compressor bypass valve device, and a bypass outlet pipe part connecting to the bypass inlet passage to introduce bypass air passed through the aperture opened by the bypass valve to the compressor bypass channel which is to be connected to the bypass outlet pipe part.

5 Claims, 9 Drawing Sheets

U.S. PATENT DOCUMENTS

| | | | |
|---|---|---|---|
| 5,142,866 A * | 9/1992 | Yanagihara et al. | 60/612 |
| 5,692,378 A * | 12/1997 | Ramsden | 60/612 |
| 6,062,024 A * | 5/2000 | Zander et al. | 60/323 |
| 6,112,523 A * | 9/2000 | Kamo et al. | 60/612 |
| 6,256,990 B1 * | 7/2001 | Itoh | 60/323 |
| 6,378,308 B1 | 4/2002 | Pflüger | 60/612 |
| 7,302,800 B2 * | 12/2007 | Klingel | 60/612 |
| 7,360,362 B2 * | 4/2008 | Nicolle et al. | 60/612 |
| 7,607,302 B2 * | 10/2009 | Fry et al. | 60/612 |
| 2003/0159442 A1 | 8/2003 | Huter et al. | 60/612 |
| 2006/0032219 A1 * | 2/2006 | Dirker | 60/323 |
| 2007/0074513 A1 * | 4/2007 | Lamb et al. | 60/612 |
| 2008/0178591 A1 * | 7/2008 | Axelsson et al. | 60/602 |
| 2009/0126659 A1 * | 5/2009 | Lester et al. | 60/598 |
| 2010/0139268 A1 * | 6/2010 | Huber et al. | 60/602 |

FOREIGN PATENT DOCUMENTS

| | | | |
|---|---|---|---|
| EP | 1953363 A2 * | 8/2008 | |
| EP | 2050939 A1 * | 4/2009 | |
| GB | 2077354 A * | 12/1981 | |
| JP | 59-82526 | 5/1984 | |
| JP | 2-305324 | 12/1990 | |
| JP | 8-6601 | 12/1990 | |
| JP | 4-22660 | 2/1992 | |
| JP | 11-182257 | 7/1999 | |
| JP | 2005-344638 | 12/2005 | |
| JP | 2009264335 A * | 11/2009 | |
| JP | 2009270470 A * | 11/2009 | |
| WO | WO 2005024201 A1 * | 3/2005 | |

* cited by examiner

MULTISTAGE EXHAUST TURBOCHARGER

TECHNICAL FIELD

The present invention relates to a multistage exhaust turbocharger for an internal combustion engine. The turbocharger comprises a high-pressure stage turbocharger having a high-pressure turbine drivable by exhaust gas from the engine and a low-pressure stage turbocharger having a low-pressure turbine drivable by exhaust gas from the high-pressure turbine. The turbochargers are arranged sequentially in the flow path of the exhaust gas, and supply air for the engine pressurized by a low-pressure compressor of the low-pressure stage turbocharger is supplied via an air supply channel to a high-pressure compressor of the high-pressure stage turbocharger to be further pressurized by the high-pressure compressor.

BACKGROUND ART

In recent years, in the field of on-vehicle engines, particularly on-vehicle diesel engines, a multistage (two-stage) exhaust turbo-charging system has been adopted in which a high-pressure stage turbocharger having a high-pressure turbine drivable by exhaust gas from the exhaust manifold of the engine cylinder and a low-pressure stage turbocharger having a low-pressure turbine drivable by exhaust gas from the high-pressure turbine are arranged sequentially in the flow path of the exhaust gas, and supply air for the engine pressurized by a low-pressure compressor of the low-pressure stage turbocharger is supplied via an air supply channel to a high pressure compressor of the high-pressure stage turbocharger to be further pressurized by the high-pressure compressor and charged to the engine.

With an engine equipped with a multistage exhaust turbocharger as mentioned above, stable operation of the engine with high turbo-charging efficiency is attained, by increasing super charge pressure in a low and middle speed operating range of the engine by performing two-stage supercharging by allowing both the high-pressure stage and low-pressure stage turbocharger to operate, and by performing single-stage supercharging in a high speed operating range of the engine by allowing only the low-pressure stage turbocharger to operate by allowing the exhaust gas and supply air to bypass the high-pressure stage turbocharger.

Figure 9:
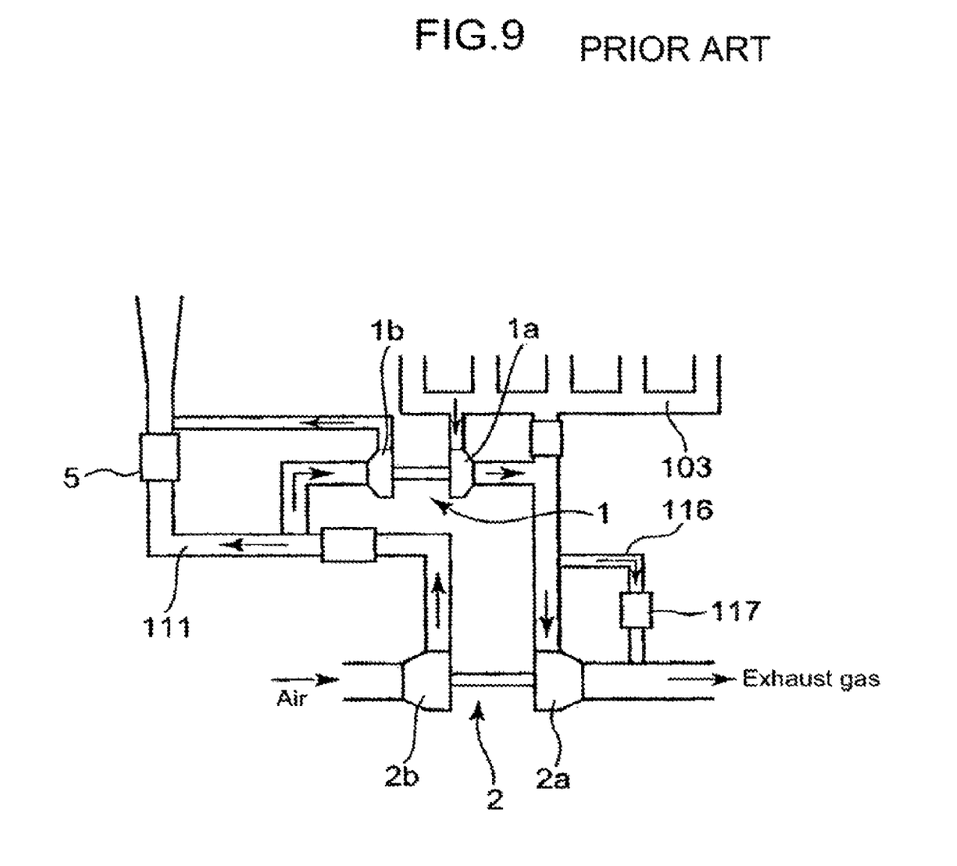
FIG. 9 is a schematic diagram showing the substantial part of the air supply and exhaust system of a conventional engine equipped with a two-stage exhaust turbocharger.

FIG. 9 is a schematic representation of such a two-stage supercharging system as disclosed for example in US 2003/0159442 A1, U.S. Pat. No. 6,378,308 B1, and JP 59-82526.

In FIG. 9, reference numeral 103 is an exhaust manifold, 1 is a high-pressure stage turbocharger having a high-pressure turbine 1a and a high-pressure compressor 1b connected to the turbine 1a by a shaft, 2 is a low-pressure stage turbocharger having a low-pressure turbine 2a and a low-pressure compressor 2b connected to the turbine 2a by a shaft.

Reference numeral 117 is an exhaust bypass valve device for controlling the flow rate of exhaust gas flowing in an exhaust bypass pipe 116, 5 is a compressor bypass valve device for controlling the flow rate of bypassed supply air flowing in a high-pressure compressor bypass pipe 111.

When allowing the engine equipped with the two-stage turbocharger to operate in a two-stage supercharging state by allowing both the high pressure stage and low-pressure stage turbocharger 1 and 2, both the exhaust bypass valve device 117 and compressor bypass valve device 5 are closed.

In this state, the exhaust gas flowing out from the exhaust manifold 103 drives both the high-pressure turbine 1a of the high-pressure stage turbocharger 1 and low-pressure turbine 1b of the low-pressure stage turbocharger 2. On the other hand, supply air pressurized by the low-pressure compressor 2b connected to the low-pressure turbine 2a is further pressurized by the high-pressure compressor 1b connected to the high-pressure turbine 1a, and supplied to each cylinder of the engine as charge air for combustion in the cylinders.

Supercharge pressure can be increased in order to increase charging pressure and output of engine by performing two-stage supercharging like this in a low, middle speed operating range of the engine.

When allowing the engine to operate in a single-stage supercharging state by the low-pressure stage turbocharger 2 in a high-speed operating range by allowing the exhaust gas and supply air to bypass the high-pressure stage turbocharger 1, the compressor bypass valve device 5 is opened and the opening of the exhaust bypass valve device 117 is controlled so that desired pressure of charge air is produced.

Most of the exhaust gas flowing out from the exhaust manifold 103 bypasses the high-pressure turbine 1a and joins with a small portion of the exhaust gas flowed through the high-pressure turbine 1a to drive the low-pressure turbine 2a.

On the other hand, most of the supply air pressurized by the low-pressure compressor 2b connected to the low-pressure turbine 2a bypasses the high-pressure compressor 1b via the high-pressure compressor bypass pipe 111 and joins a small portion of the supply air flowed through the high-pressure compressor 1b to be supplied to each cylinder of the engine as charge air.

In a high speed operating range of the engine, stable operation of the engine with high turbo-charging efficiency is realized by performing single-stage supercharging by the low-pressure stage turbocharger 2 by allowing most of the exhaust gas and supply air to bypass the high-pressure stage turbocharger 1.

A comparatively large installation space is required in the engine room to install an engine equipped with a two-stage exhaust turbocharger of this type because it is inevitably increased in bulk as compared with a single-stage one.

It is required in the case of on-vehicle engine to reduce the bulk of the two-stage exhaust turbocharger as far as possible in order to mount an engine equipped with a two-stage exhaust turbocharger in the conventionally narrow engine room of the vehicle.

However, in engines equipped with a two-stage exhaust turbocharger disclosed in U.S. Pat. No. 6,378,308 B1 and JP 59-82526, particularly an air supply path from a low-pressure compressor 2b to a high-pressure compressor 1b and an air supply bypass path from the low pressure compressor 2b to a compressor bypass valve device 5 on a high-pressure compressor bypass pipe 111 are arranged in a horizontal plane, so the size in the horizontal direction of the two-stage exhaust turbocharger is large, and it is difficult to secure an installation space for mounting the engine in a narrow engine room of a vehicle.

As to the engine equipped with a two-stage exhaust turbocharger disclosed in US 2003/0159442 A1, a high-pressure stage turbocharger 1 and low-pressure stage exhaust turbocharger 2 are arranged three dimensionally in order to make it possible to connect them with exhaust and air supply paths of minimum length and reduce the bulk of the two-stage exhaust turbocharger assembly. However, as the casings of the high-pressure stage and low-pressure stage turbochargers are composed completely separately with exhaust and air supply channels for connecting them being provided, the bulk of the two-stage exhaust turbocharger assembly is still not reduced enough, and it is still not easy to secure an installation space for mounting the engine in a narrow engine room of a vehicle.

SUMMARY OF THE INVENTION

The present invention was made in light of the problems in conventional art, and the object is to provide a multistage exhaust turbocharger which is simplified in construction and reduced in bulk, thereby obtaining an engine equipped with the multistage exhaust turbocharger easily mountable in a narrow engine room of a vehicle.

To attain the object, the present invention proposes a multistage exhaust turbocharger for an internal combustion engine including a high-pressure stage turbocharger having a high-pressure turbine drivable by exhaust gas exhausted from an exhaust manifold of the engine and a low-pressure stage turbocharger having a low-pressure turbine drivable by exhaust gas flowed out from the high-pressure turbine after driving the turbine. The turbochargers are arranged sequentially in the flow path of the exhaust gas of the engine, and supply air for the engine pressurized by a low-pressure compressor of the low-pressure stage turbocharger is supplied via an air supply channel to a high-pressure compressor of the high-pressure stage turbocharger to be further pressurized by the high-pressure compressor. A compressor bypass valve device is provided which allows a part of the supply air to bypass the high-pressure compressor via a compressor bypass channel, wherein a high-pressure compressor cover of the high-pressure stage turbocharger is composed such that it has a compressor inlet passage, a bypass inlet passage, a switching aperture between both the passages to be opened and closed by a valve body of the compressor bypass valve device, and a bypass outlet pipe part connecting to the bypass inlet passage to introduce bypass air passed through the aperture opened by the bypass valve to the compressor bypass channel which is to be connected to the bypass outlet pipe part.

In the invention, it is preferable that:
(1) the compressor bypass valve device is composed as a compressor bypass valve unit including the bypass valve body and an actuator for moving the bypass valve body to open and close the switching aperture, and the valve unit is installed detachably on the high-pressure compressor cover, and
(2) the bypass outlet pipe part formed integral with the high-pressure compressor cover is formed to extend at a right angle to the rotation axis of the high-pressure compressor adjacent the compressor bypass valve unit installed detachably on the high-pressure compressor cover.

According to the invention, the high-pressure compressor cover is composed such that it has a compressor inlet passage for supply air to be introduced to the high-pressure compressor, a bypass inlet passage which is communicated with the compressor inlet passage via the switching aperture when the aperture is opened by the bypass valve body, and a bypass outlet pipe part extending at a right angle to the rotation axis of the high-pressure compressor to introduce bypass air passed through the aperture to the compressor bypass channel which is to be connected to the bypass outlet pipe part which is formed integral with the compressor cover extending as mentioned above adjacent the bypass valve device unit installed on the compressor cover, so the high-pressure compressor cover has the supply air inlet passage for introducing supply air to the high-pressure compressor, the bypass inlet passage through which bypass air flows to the compressor bypass channel, and the bypass outlet pipe part integral with it, and piping is not needed to connect them.

Therefore, construction of the air inlet part of the high-pressure compressor and the connecting part thereof to the compressor bypass channel become compact and reduced in bulk. As a result, installation space of the high-pressure compressor can be reduced, and an engine equipped with a two-stage exhaust turbocharger easy to be mounted in a narrow engine room of a vehicle can be obtained.

Further, by composing the compressor bypass valve device as a unit including the compressor bypass valve for opening and closing the switching aperture between the compressor inlet passage and the bypass outlet passage and an actuator for driving the compressor bypass valve, installation of the compressor bypass valve device is facilitated, which contributes to reduction in assembling cost.

It is preferable that the seating face of the bypass valve body actuated by the actuator to seat on and depart from a valve seat formed along the peripheral part of the switching aperture to open and close the switching aperture is formed into an arcuate surface in cross-section.

With this configuration, the seating face of the valve body seats on the valve seat formed on the partition wall with line contact, so minute profile inaccuracy of the seating face and valve seat is accommodated, even contact between the seating surfaces of the valve body and the valve seat plane can be attained, variation in sealing function of the bypass valve is eliminated, and a compressor bypass valve device having stable sealing function can be obtained.

The invention proposes a multistage exhaust turbocharger for an internal combustion engine including a high-pressure stage turbocharger having a high-pressure turbine drivable by exhaust gas exhausted from an exhaust manifold of the engine and a low-pressure stage turbocharger having a low-pressure turbine drivable by exhaust gas flowed out from the high-pressure turbine after driving the turbine. The turbochargers are arranged sequentially in the flow path of the exhaust gas of the engine. Supply air for the engine pressurized by a low-pressure compressor of the low-pressure stage turbocharger is supplied via an air supply channel to a high-pressure compressor of the high-pressure stage turbocharger to be further pressurized by the high-pressure compressor. A compressor bypass valve device is provided which allows a part of the supply air to bypass the high-pressure compressor via a compressor bypass channel, wherein a high-pressure turbine housing is cast integral with the exhaust manifold, an exhaust gas guide member is attached to the high-pressure turbine housing at an exhaust gas outlet side flange thereof, and a low-pressure turbine housing is attached to the exhaust gas guide member at a low-pressure turbine mounting flange thereof.

It is preferable that the flange face of the exhaust gas exit side flange of the high-pressure turbine housing is perpendicular to flange faces of flanges of the exhaust manifold for attaching the manifold to the engine.

According to the invention, the exhaust gas guide member is attached to the high-pressure turbine housing cast integral with the exhaust manifold and the low-pressure turbine housing is attached to the exhaust gas guide member at its low-pressure turbine mounting flange extending in a direction parallel to the rotation axis of the high-pressure stage turbocharger, the high-pressure turbine housing, the exhaust gas guide member, and the low-pressure turbine housing can be connected directly to one another without the need for providing any piping between them. Therefore, construction of the connecting part between the turbine housing of the high-pressure stage turbocharger and the turbine housing of the low-pressure stage turbocharger becomes compact. As a result, installation space of the turbine housing of the high-pressure stage turbocharger and the turbine housing of the low-pressure stage turbocharger can be reduced, and an engine equipped with a two-stage exhaust turbocharger easy to mount in a narrow engine room of a vehicle can be obtained.

Further, according to the second embodiment, machining of the flange face of each of the flanges of the exhaust manifold can be facilitated, for the flange faces are perpendicular to the flange face of the exhaust gas exit side flange of the high-pressure turbine housing, and the flange faces of the flanges of the exhaust manifold can be machined using the flange face of the exhaust gas exit side flange of the turbine housing as a reference plane.

Thus, machining of the exhaust manifold formed integral with the high-pressure turbine housing is facilitated and man-hours needed to fabricate and assemble the high-pressure stage exhaust turbocharger can be reduced.

According to the invention, by composing the high-pressure compressor cover such that it has the compressor inlet passage, the bypass inlet passage which is communicated with the compressor inlet passage via the switching aperture when the aperture is opened by the bypass valve body, and a bypass outlet pipe part communicating with the bypass inlet passage, the high-pressure compressor cover is composed integral with the supply air inlet passage for introducing supply air to the high-pressure compressor, the bypass inlet passage through which bypass air flows to the compressor bypass channel via the bypass outlet pipe part when the switching aperture is opened by the compressor bypass valve device, and the bypass outlet pipe part to which the compressor bypass channel is to be connected, without the need for providing any piping between them.

Therefore, construction of the air inlet part of the high-pressure compressor and the connecting part thereof to the compressor bypass channel become compact and reduced in bulk, as a result installation space of the high-pressure compressor can be reduced, and an engine equipped with a two-stage exhaust turbocharger easy to be mounted in a narrow engine room of a vehicle can be obtained.

Further, by composing the compressor bypass valve device as a unit including the compressor bypass valve for opening and closing the switching aperture between the compressor inlet passage and the bypass outlet passage and an actuator for driving the compressor bypass valve, installation of the compressor bypass valve device is facilitated, which contributes to reduction in assembling cost.

Further, according to the invention, as the exhaust gas guide member is attached to the high-pressure turbine housing cast integral with the exhaust manifold and the low-pressure turbine housing is attached to the exhaust gas guide member at its low-pressure turbine mounting flange extending in a direction parallel to the rotation axis of the high-pressure stage turbocharger, the high-pressure turbine housing, the exhaust gas guide member, and the low-pressure turbine housing can be connected directly to one another without the need for providing any piping between them. Therefore, construction of the connecting part between the turbine housing of the high-pressure stage turbocharger and the turbine housing of the low-pressure stage turbocharger becomes compact. As a result, installation space of the turbine housing of the high-pressure stage turbocharger and the turbine housing of the low-pressure stage turbocharger can be reduced, and an engine equipped with a two-stage exhaust turbocharger easy to be mounted in a narrow engine room of a vehicle can be obtained.

Further, machining of the flange face of each of the flanges of the exhaust manifold can be facilitated by using the flange face, which is perpendicular to the flange faces of the exhaust manifold, of the exhaust gas exit side flange of the high-pressure turbine housing as a reference plane.

Thus, machining of the exhaust manifold formed integral with the high-pressure turbine housing is facilitated and man-hours needed to fabricate and assemble the high-pressure stage exhaust turbocharger can be reduced.

DETAILED DESCRIPTION OF THE INVENTION

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 8:
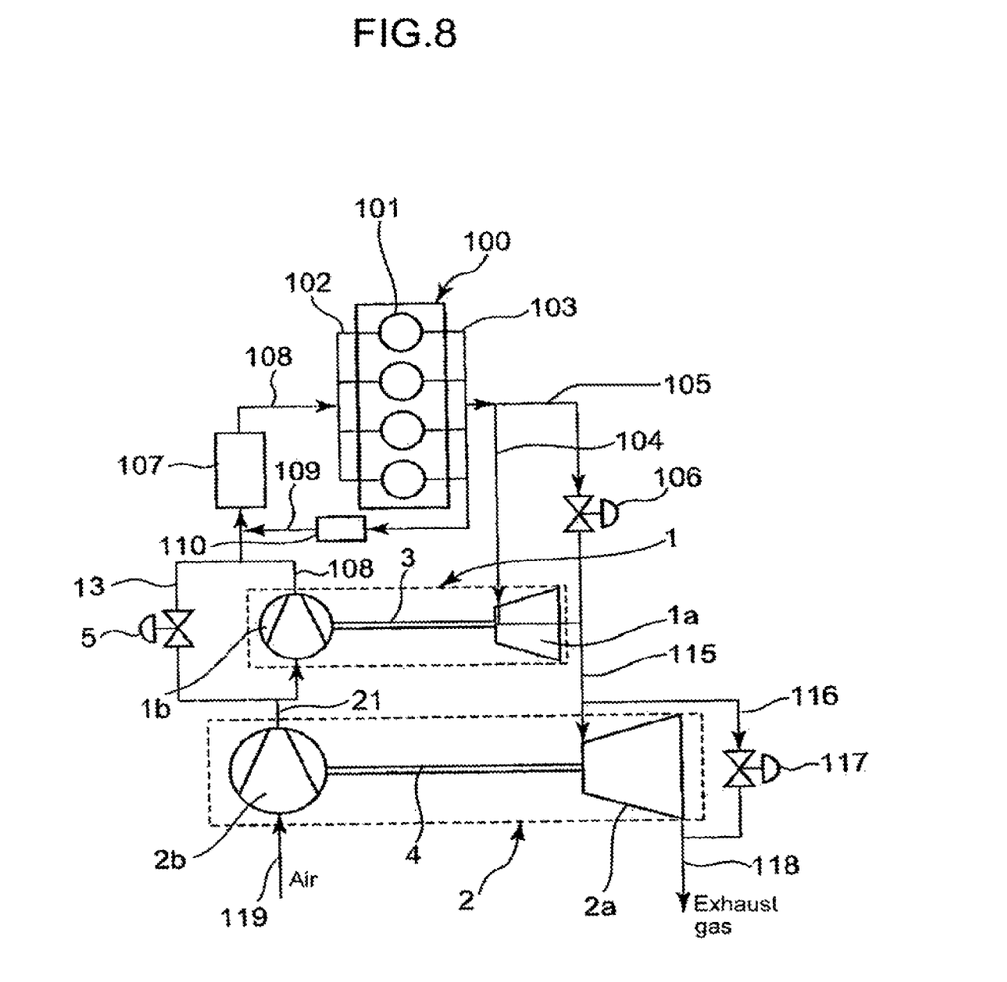
FIG. 8 is a schematic diagram showing the air supply and exhaust system of an engine equipped with a two-stage exhaust turbocharger to which the present invention is applied.

FIG. 8 is a schematic diagram showing the air supply and exhaust system of an engine equipped with a two-stage exhaust turbocharger to which the present invention is applied.

Referring to FIG. 8, reference numeral 100 is an engine, 101 is cylinders of the engine (four cylinders in the drawing), 102 is an intake manifold, 103 is an exhaust manifold, 1 is a high-pressure stage turbocharger having a high-pressure turbine 1$a$ and a high-pressure compressor 1$b$ connected by a shaft 3 to the turbine 1$a$, and 2 is a low-pressure stage turbocharger having a low-pressure turbine 2$a$ and a low-pressure compressor 2$b$ connected by a shaft 4 to the turbine 2$a$.

Reference numeral 104 is a high-pressure exhaust channel connecting the exhaust outlet of the exhaust manifold 103 to the exhaust inlet of the high-pressure turbine 1$a$, 115 is an exhaust channel connecting the exhaust outlet of the high-pressure turbine 1$a$ to the inlet of the low-pressure turbine 2$a$. Reference numeral 118 is an exhaust pipe for exhausting the exhaust gas flowing out from the low-pressure turbine 2$a$.

Reference numeral 105 is an exhaust bypass channel for introducing the exhaust gas from the exhaust manifold 103 to the low-pressure turbine 2a bypassing the high-pressure turbine 1a, 106 is a stage control valve for controlling the flow rate of the bypassing exhaust gas. Reference numeral 116 is an exhaust bypass channel for introducing the exhaust gas flowing in the exhaust channel 115 to the exhaust pipe 118 bypassing the low-pressure turbine 2a, 117 is an exhaust bypass valve device for controlling the flow rate of the bypassing exhaust gas flowing in the exhaust bypass channel 116.

Reference numeral 119 is a suction pipe for introducing air from outside to the inlet of the low-pressure compressor 2b. Reference numeral 21 is an air supply channel connecting the outlet of the low-pressure compressor 2b to the inlet of the high-pressure compressor 1b. Reference numeral 108 is an air supply pipe connecting the outlet of the high-pressure compressor 1b to the inlet manifold 102, and 107 is an air cooler provided at the air supply pipe 108 to cool the air charged to the engine.

Reference numeral 13 is a high-pressure compressor bypass channel for introducing the supply air to the air supply pipe 108 bypassing the high-pressure compressor 1b, and 5 is a compressor bypass valve device for controlling the flow rate of the bypassing supply air flowing in the compressor bypass channel 13.

Reference numeral 109 is an EGR conduit for extracting a part of the exhaust gas from the exhaust manifold 103 and introducing it to the air supply pipe 108 as exhaust recirculation gas, and 110 is an EGR valve for controlling the flow rate of the exhaust recirculation gas.

When operating the engine equipped with the two-stage turbocharger in a two-stage supercharging state by allowing both the high-pressure stage and low-pressure stage turbocharger 1 and 2 to operate, both the exhaust bypass valve device 117 and compressor bypass valve device 5 are closed when operating in the complete two-stage supercharging state in a low speed range, and when operating in variable two-stage ranges, the compressor bypass valve device 5 and the exhaust bypass valve device 117 are closed and the opening of the stage control valve 106 is controlled.

In this operation mode, the exhaust gas from the exhaust manifold 103 drives the high-pressure turbine 1a and low-pressure turbine 2a. On the other hand, supply air pressurized by the low-pressure compressor 2b is further pressurized by the high-pressure compressor 1b, then cooled by the air cooler 107, and supplied to the cylinders 101 of the engine 100 as charge air for combustion of fuel injected into the cylinders 101.

Supercharge pressure can be increased to increase engine output by performing two-stage supercharging like this in a low, middle speed operating range of the engine.

When allowing the engine to operate in a single-stage supercharging state by the low-pressure stage turbocharger 2 in a high-speed operating range by allowing the exhaust gas and supply air to bypass the high-pressure stage turbocharger 2, the stage control valve 106 and compressor bypass valve device 5 are opened and the opening of the exhaust bypass valve device 117 is controlled so that desired pressure of charge air is produced.

In this mode of operation, most of the exhaust gas flowing out from the exhaust manifold 103 bypasses the high-pressure turbine 1a and flow to the exhaust channel 115 via the exhaust bypass channel 105 and stage control valve 106 which is opened, and joins with a small portion of the exhaust gas flowed through the high-pressure turbine 1a to drive the low-pressure turbine 2a.

In this case, as the flow rate of the exhaust gas flowing through the high-pressure turbine 1a is very small, the high-pressure stage turbocharger 1 practically does not work.

On the other hand, most of the supply air pressurized by the low-pressure compressor 2b connected to the low-pressure turbine 2a bypasses the high-pressure compressor 1b by flowing through the high-pressure compressor bypass channel 13 and joins with a small portion of the supply air flowed through the high-pressure compressor 1b to be supplied to the cylinders 101 of the engine 100 via the cooler 107 and air supply pipe 108.

By performing single-stage supercharging by the low-pressure stage turbocharger 2 by allowing most of the exhaust gas and supply air to bypass the high-pressure stage turbocharger 1, stable operation of the engine with high turbocharging efficiency is realized in a high speed operating range of the engine.

The present invention relates to improvement in structure of the two-stage exhaust turbocharger which works as mentioned above.

The First Embodiment

Figure 1:
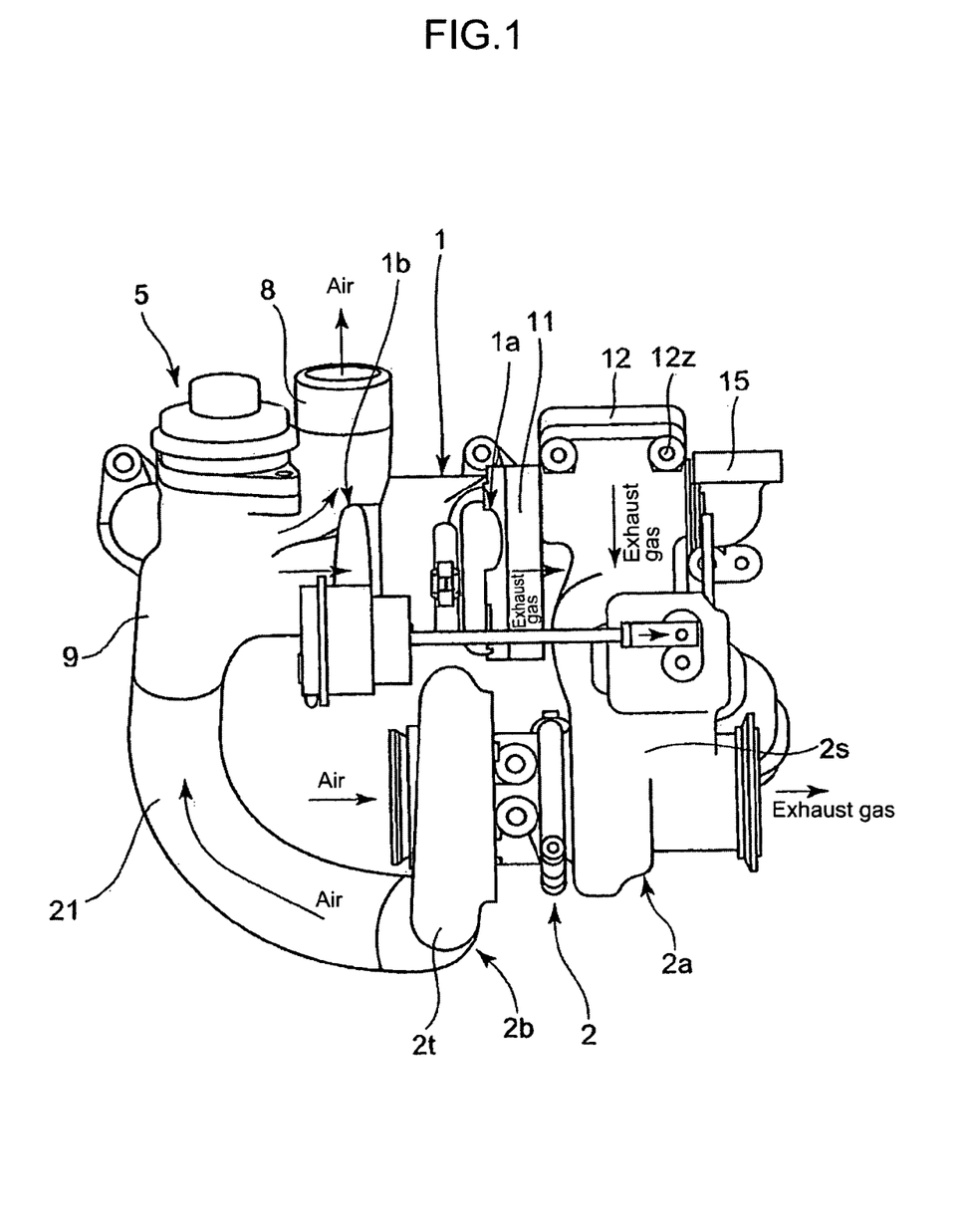
FIG. 1 is aside elevation showing the total construction of the first embodiment of the two-stage exhaust turbocharger according to the invention.
Figure 2:
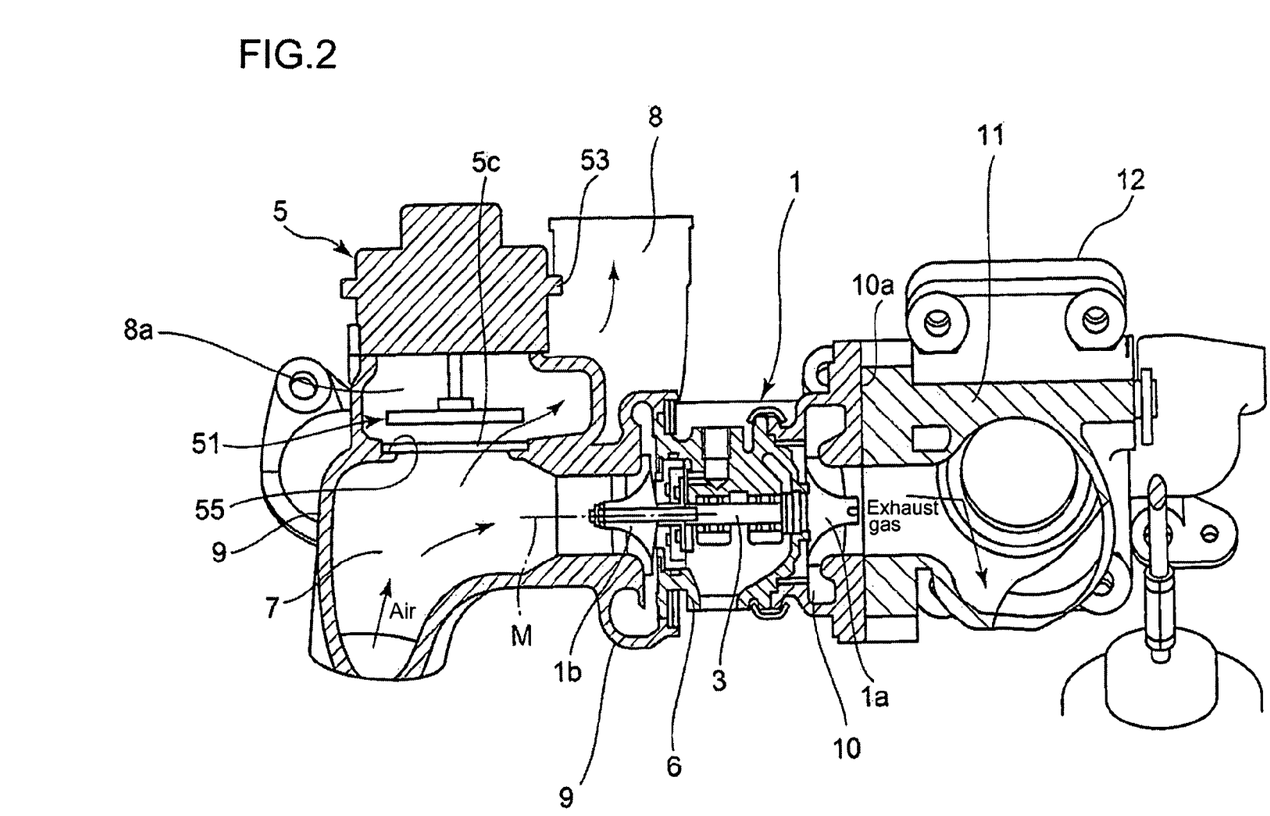
FIG. 2 is a sectional view of the first embodiment of FIG. 1 along the centerline of the rotor shaft of the high-pressure stage turbocharger.
Figure 3:
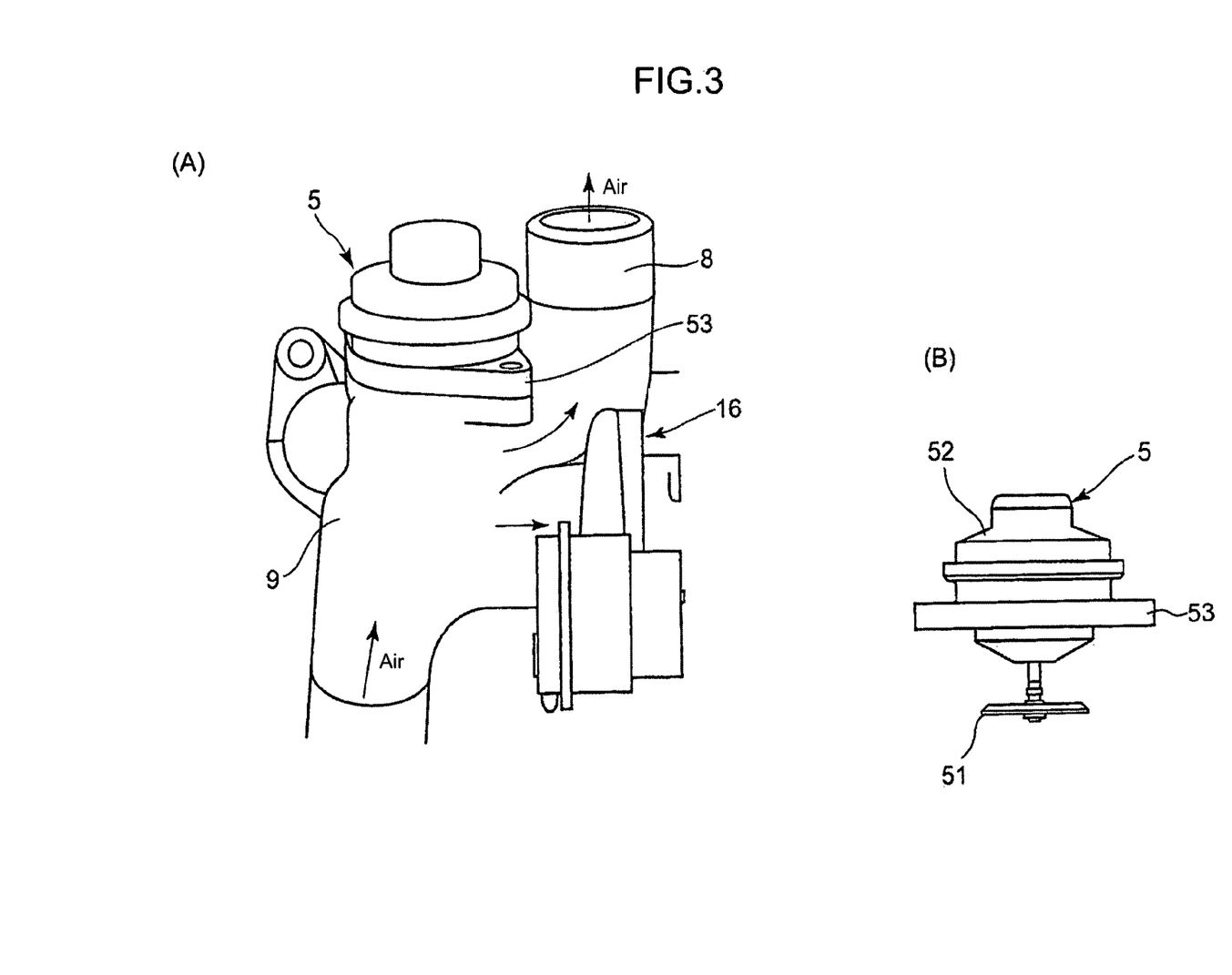
FIG. 3A is a perspective external view of the high-pressure compressor cover provided with the compressor bypass valve device in the first embodiment.
FIG. 3B is an external view of the compressor bypass valve device.
Figure 4:
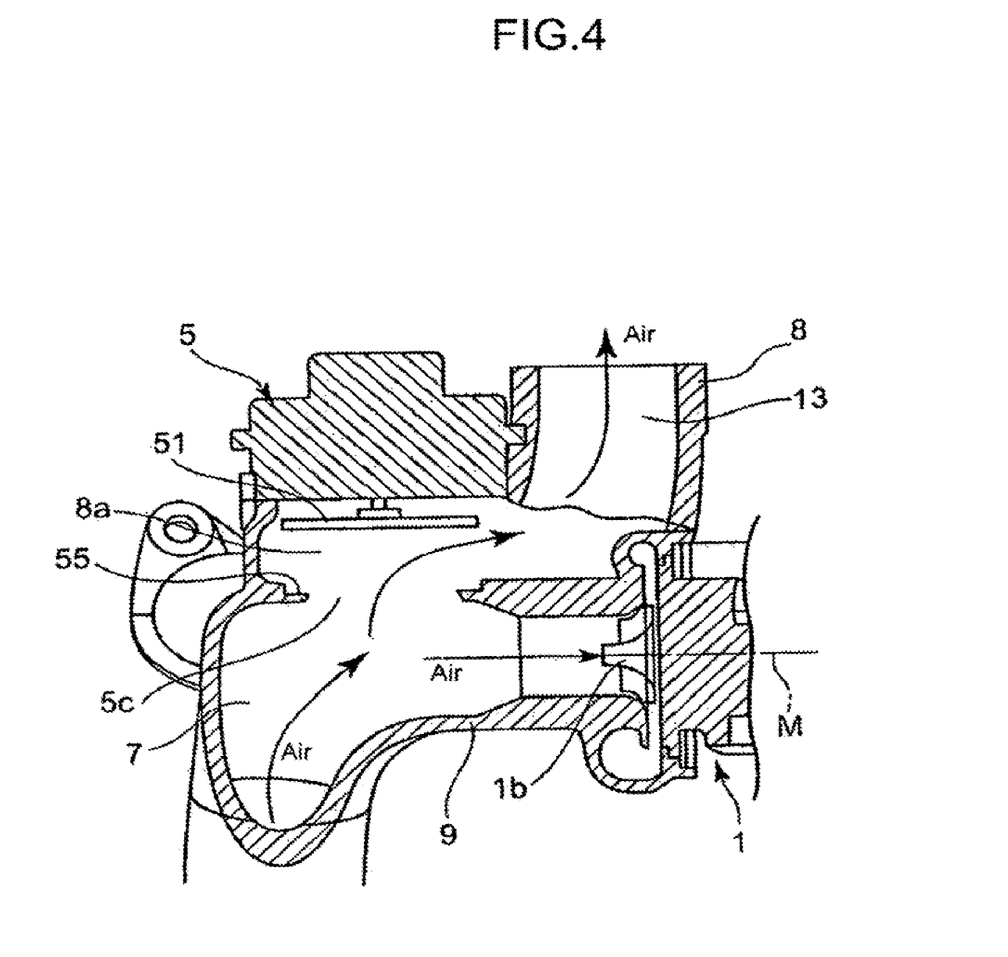
FIG. 4 is a sectional view of the high-pressure compressor cover in the first embodiment.

FIG. 1 is aside elevation showing the total construction of the first embodiment of the two-stage exhaust turbocharger according to the invention, FIG. 2 is a sectional view of the first embodiment of FIG. 1 along the center line of the rotor shaft of the high-pressure stage turbocharger, FIG. 3A is a perspective external view of the high-pressure compressor cover provided with the compressor bypass valve device, FIG. 3B is an external view of the compressor bypass valve device, and FIG. 4 is a sectional view of the high-pressure compressor cover.

Referring to FIGS. 1 to 4, reference numeral 1 is a high-pressure stage turbocharger having a high-pressure turbine 1a and a high-pressure compressor 1b connected to the turbine 1a by a shaft 3 (see FIG. 8), 2 is a low-pressure stage turbocharger having a low-pressure turbine 2a and a low-pressure compressor 2b connected to the turbine 2a by a shaft 4 (see FIG. 8).

Reference numeral 10 is a high-pressure turbine housing of the high-pressure stage turbocharger 1, 9 is a high-pressure compressor cover, and 11 is an exhaust channel. Reference numeral 2s is a low-pressure turbine housing of the low-pressure stage turbocharger 2, and 2t is a low-pressure compressor cover. These will be detailed later.

Reference numeral 21 is an air supply channel connecting the low-pressure compressor cover 2t to the high-pressure compressor cover 9. The air supply channel 21 is made of metal material, such as a steel pipe, and aluminum pipe, or a resin or hard rubber pipe having flexibility. The channel 21 is connected to the compressor cover 2t and the compressor cover 9 by means of a clamp or other connection means respectively.

In FIG. 2 showing the high-pressure stage turbocharger 1 in longitudinal section, reference numeral 10 is a high-pressure turbine housing 10 of cast metal, 1a is a high-pressure turbine of radial flow type, 1b is a high-pressure compressor connected to the turbine 1a, 3 is a high-pressure stage rotor shaft connecting the turbine 1a and the compressor 1b, 9 is a high-pressure compressor made of cast metal, and 6 is a high-pressure stage bearing housing made of cast metal.

Reference numeral 11 is an exhaust gas guide member made of cast metal, which is connected to a flange (10a indicates its flange face) of the high-pressure turbine housing 10 with the longitudinal center line of the channel coinciding the rotation axis M of the high-pressure turbine 1a by means of a plurality of bolts not shown in the drawing. The exhaust gas guide member 11 has a low-pressure turbine-mounting flange 12. The mounting flange 12 extends in the direction parallel to the rotation axis M, and the low-pressure turbine housing 2s is connected directly to the mounting flange 12 by means of a plurality of bolts (12z indicates a bolt hole).

As shown in FIG. 2 and FIG. 4, the high-pressure compressor cover 9 has a compressor inlet passage 7 to which supply air is introduced from the low-pressure compressor 2b via the air supply channel 21 and a bypass inlet passage 8a. A switching aperture 5c which is opened and closed by the compressor bypass valve device 5 is formed between the compressor inlet passage 7 and the bypass inlet passage 8a.

The high-pressure compressor cover 9 has also a bypass outlet pipe part 8 to which the compressor bypass channel 13 is to be connected. The bypass outlet pipe part 8 is formed integrally with the compressor cover 9 in a form extending in a direction perpendicular to the rotation axis M adjacent a case 53 installed to the compressor cover 9, the compressor bypass valve device 5 being attached to the case 53.

As can be seen in FIGS. 2 to 4, particularly in FIGS. 3A and 3B, the compressor bypass valve device 5 is composed as a bypass valve unit including a compressor bypass valve 51 and an actuator 52 attached to the case 53 attached detachable on the upper part of the compressor cover 9. The compressor bypass valve 51 opens or closes the switching aperture 5c to communicate or shut off the compressor inlet passage 7 to or from the bypass inlet passage 8a by the actuation of the actuator 52, thereby communicating or shutting off the compressor inlet passage 7 to or from the compressor bypass channel 13. The switching aperture 5c is closed or opened by allowing a valve body 51a of the compressor bypass valve 51 to seat on or depart from a valve seat 55 formed on the peripheral part of the switching aperture 5c by the reciprocation actuation of the actuator 52.

Figure 5:
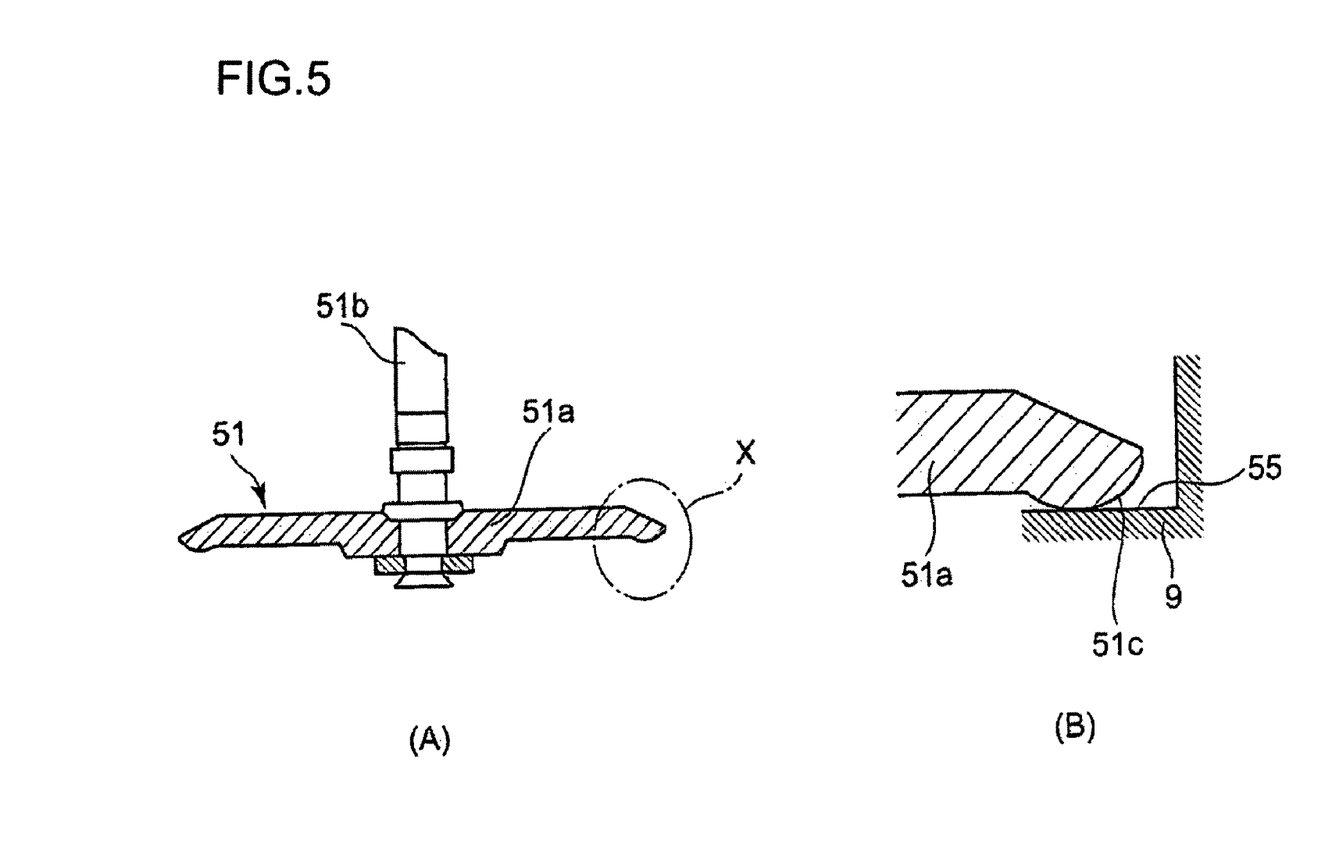
FIG. 5A is a sectional view of the compressor bypass valve body.
FIG. 5B is an enlarged detail of the portion encircled by X in FIG. 5A.

FIG. 5A is a sectional view of the compressor bypass valve body, and FIG. 5B is an enlarged detail of the portion encircled by X in FIG. 5A. Referring to FIGS. 5A, 5B, FIG. 2, and FIG. 3B, the compressor bypass valve 51 has a valve shaft 51b to which the valve body 51a is fixed at an end thereof, and the valve shaft 51b is connected to the actuator 52. The underside of the peripheral part of the valve body 51a is formed to be an arcuate surface in cross-section as indicated by reference numeral 51c which forms a seat surface as seen in FIG. 5B so that the seat surface 51c seats on the valve seats 55 of the compressor cover 9 when the valve closes the switching aperture 5c.

With this configuration, the seating face 51c seats on the valve seat 55 with line contact, so a minute profile inaccuracy of the seating face 51c and valve seat 55 is accommodated, even contact between the seating surfaces of the valve body and valve seat plane can be attained, variation in sealing function of the bypass valve is eliminated, and a compressor bypass valve device having stable sealing function can be obtained.

According to the first embodiment, by composing such that: the compressor cover 9 of the high-pressure compressor 1b has the compressor inlet passage 7 to which supply air is introduced from the low-pressure compressor 2b via the air supply channel 21 and the bypass inlet passage 8a, the switching aperture 5c which is opened and closed by the compressor bypass valve device 5 being formed between the compressor inlet passage 7 and the bypass inlet passage 8a; and, in addition, such that the compressor cover 9 has the bypass outlet pipe part 8 to which the compressor bypass channel 13 is to be connected, the bypass outlet pipe part 8 being formed integrally with the compressor cover 9 in a form extending in a direction perpendicular to the rotation axis M adjacent the case 53 attached to the compressor cover 9, the compressor bypass valve device 5 being attached to the case 53; the high-pressure compressor cover 9 can be composed integrally with the supply air inlet passage 7 for introducing supply air to the high-pressure compressor 1b, the bypass inlet passage 8a through which bypass airflows to the compressor bypass channel 13 via the bypass outlet pipe part 8 when the switching aperture 5c is opened by the compressor bypass valve device 5, and the bypass outlet pipe part 8 to which the compressor bypass channel 13 is to be connected, without the need for providing any piping between them.

Therefore, construction of the air inlet part of the high-pressure compressor 1b and the connecting part thereof to the compressor bypass channel 13 become compact and reduced in bulk. As a result, installation space of the high-pressure compressor 1b can be reduced, and an engine equipped with a two-stage exhaust turbocharger easy to be mounted in a narrow engine room of a vehicle can be obtained.

Further, by composing the compressor bypass valve device 5 as a unit including the compressor bypass valve 51 for opening and closing the switching aperture 5c between the compressor inlet passage 7 and the bypass inlet passage 8a and an actuator 52 for driving the compressor bypass valve 51, installation of the compressor bypass valve device 5 is facilitated, which contributes to a reduction in assembling cost.

The Second Embodiment

FIG. 6A is a side elevation showing the turbine housing of the high-pressure stage exhaust turbocharger in the second embodiment of the invention, and FIG. 6B is a view in the direction of arrow Y in FIG. 6A. FIG. 7 is a view in the direction of arrow W in FIG. 6A.

Figure 6:
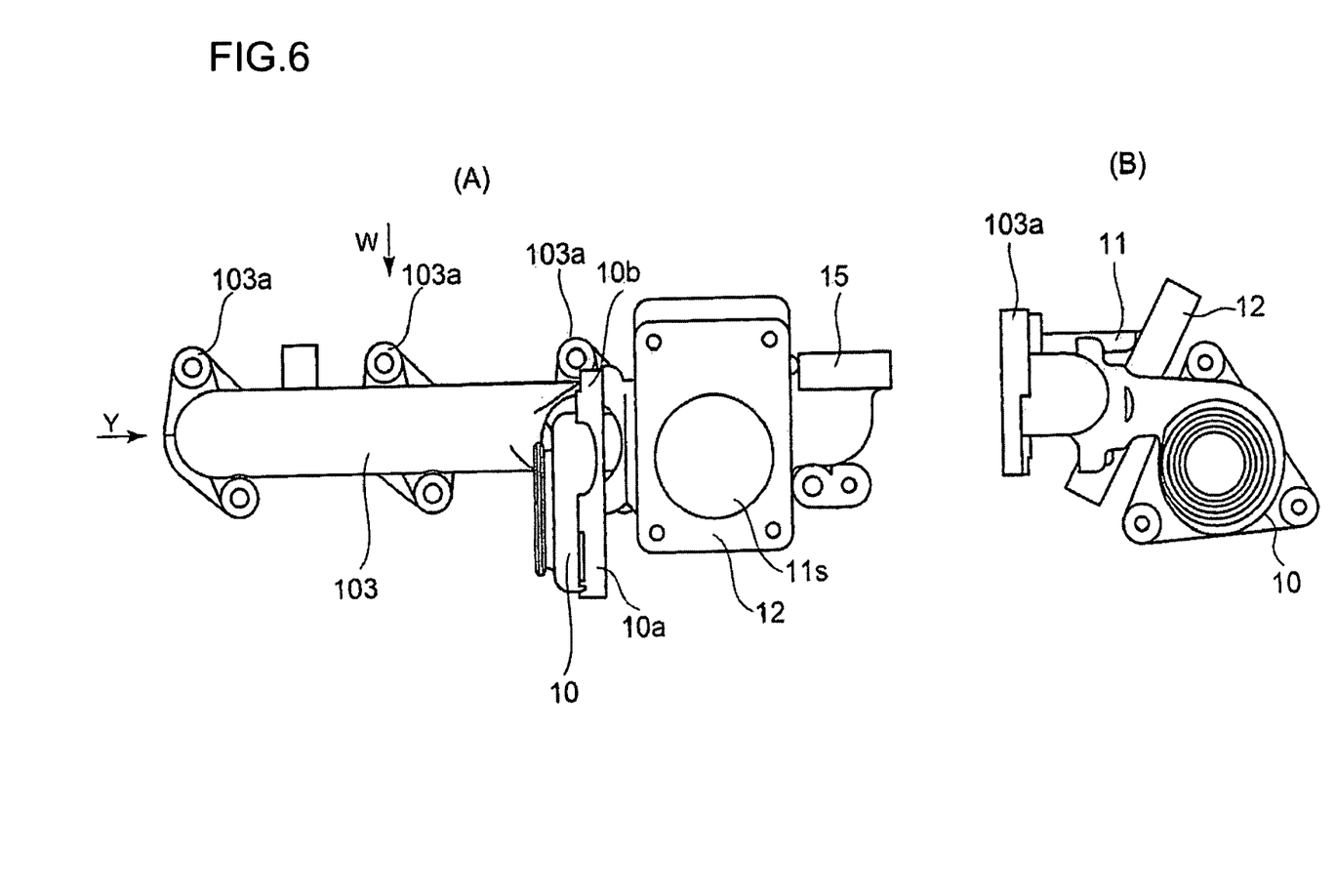
FIG. 6A is a side elevation showing the turbine housing of the high-pressure stage exhaust turbocharger in the second embodiment of the invention.
FIG. 6B is a view in the direction of arrow Y in FIG. 6A.
Figure 7:
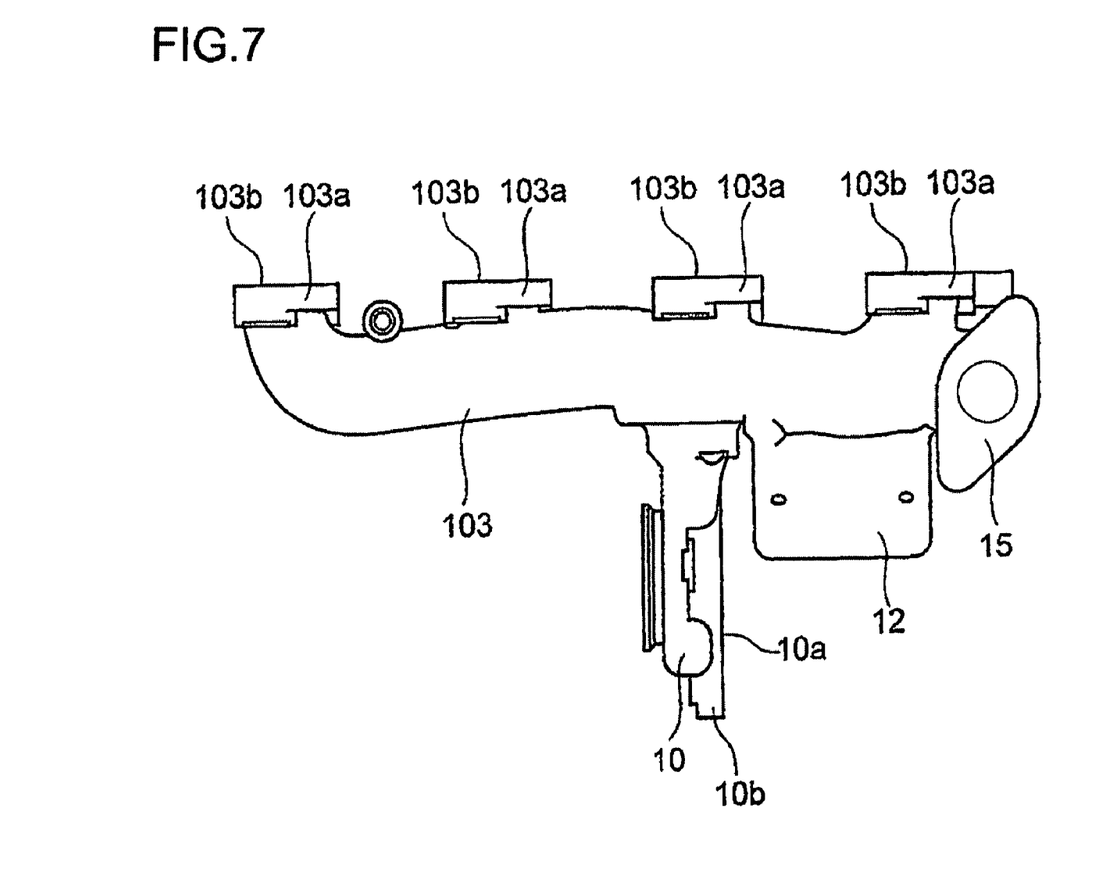
FIG. 7 is a view in the direction of arrow W in FIG. 6A.

Referring to FIGS. 6-7, reference numeral 103 is an exhaust manifold, which is formed integral with the high-pressure turbine housing 10 of the high-pressure stage turbocharger 1 and made by metal casting. The exhaust gas guide member 11 is connected to the flange face 10a of an exhaust gas exit side the flange 10b of the high-pressure turbine housing 10 by a plurality of bolts not shown in the drawings with the longitudinal center line of the exhaust gas guide member 11 coinciding the rotation axis M of the high-pressure turbine 1a.

Reference numeral 103a is a flange of the exhaust manifold 103. The flange face 103b of each flange 103a is perpendicular to the flange face 10a of the flange 10b of the high-pressure turbine housing 10, and the exhaust manifold is fixed to the engine via the flanges 103a by means of a plurality of bolts not shown in the drawings.

The exhaust gas guide member 11 has a low-pressure turbine mounting flange 12 for connecting the low-pressure stage turbocharger 2b thereto, the low-pressure turbine mounting flange 12 extending in the direction parallel to the rotation axis M. The low-pressure turbine housing 2s is connected to the mounting flange 12 by means of a plurality of bolts (12z indicate a bolt hole), as shown in FIG. 1. Exhaust gas flowed out from the high-pressure turbine 1a into an exhaust gas passage 11s in the exhaust gas guide member 11 is introduced to the inlet of the low-pressure turbine 2a of which the low-pressure turbine housing 2s is attached to the mounting flange 12 of the exhaust gas guide member 11 as shown in FIG. 1.

Reference numeral 15 is an EGR flange to which a conduit for extracting exhaust recirculation gas is attached.

According to the second embodiment, by forming the flange 10b of the high-pressure turbine housing 10 integral with the exhaust manifold 103, connecting the exhaust gas guide member 11 to the flange 10b of the high-pressure turbine housing 10, and connecting the turbine housing 2s of the low-pressure stage turbocharger 2 to the mounting flange 12 of the exhaust gas guide member 11, the high-pressure turbine housing 10, exhaust gas guide member 11, and low-pressure turbine housing 2s can be connected directly one another without the need for providing any piping between them. Therefore, construction of the connecting part between the turbine housing 10 of the high-pressure stage turbocharger 1 and the turbine housing 2s of the low pressure stage turbocharger 2 becomes compact, as a result installation space of the turbine housing 10 of the high-pressure stage turbocharger 1 and the turbine housing 2s of the low-pressure stage turbocharger 2 can be reduced, and an engine equipped with a two-stage exhaust turbocharger easy to be mounted in a narrow engine room of a vehicle can be obtained.

Further, according to the second embodiment, machining of the flange face 103b of each of the flanges 103a of the exhaust manifold 103 can be facilitated, for the flange faces 103b are perpendicular to the flange face 10a of the flange 10b of the high-pressure turbine housing 10, and the flange faces 103b can be machined using the flange face 10a of the turbine housing 10 as a reference plane.

Thus, machining of the exhaust manifold 103 formed integral with the high-pressure turbine housing 10 is facilitated and man-hours needed to fabricate and assemble the high-pressure stage exhaust turbocharger can be reduced.

INDUSTRIAL APPLICABILITY

According to the invention, the multistage exhaust turbocharger can be simplified in construction and reduced in bulk and an engine equipped with the multistage exhaust turbocharger easily mountable in a narrow engine room of a vehicle can be obtained.

The invention claimed is:

1. A multistage exhaust turbocharger for an internal combustion engine, the multistage exhaust turbocharger comprising:
   a low-pressure stage turbocharger having a low-pressure turbine housing including a low-pressure turbine;
   a high-pressure stage turbocharger having a high-pressure turbine housing including a high-pressure turbine drivable by exhaust gas exhausted from an exhaust manifold of the internal combustion engine, and having a high-pressure compressor cover including:
      a compressor inlet passage located between an air supply channel that is connected to an outlet of a low-pressure compressor and an inlet of a high-pressure compressor; and
      a bypass inlet passage diverged from the compressor inlet passage;
      a switching aperture formed between the compressor inlet passage and the bypass inlet passage;
      a compressor bypass valve device attached to the high-pressure compressor cover, the compressor bypass valve device for opening and closing the switching aperture; and
      a bypass outlet pipe part connected to the bypass inlet passage, and located adjacent, via a partition wall, to a case having the compressor bypass valve device therein, the bypass outlet pipe part being formed integrally with the high-pressure compressor cover so as to extend at a right angle to a rotation axis of the high-pressure compressor.

2. The multistage exhaust turbocharger according to claim 1, wherein said compressor bypass valve device is a compressor bypass valve unit including a bypass valve body and an actuator for moving the bypass valve body to open and close the switching aperture, and the compressor bypass valve unit is installed detachably on the high-pressure compressor cover.

3. The multistage exhaust turbocharger according to claim 2, wherein a seating face of the bypass valve body actuated by the actuator to seat on and depart from a valve seat formed along a peripheral part of the switching aperture to open and close the switching aperture is an arcuate surface in cross-section.

4. The multistage exhaust turbocharger according to claim 1, further comprising an exhaust gas guide member, wherein
   a high-pressure turbine side of the high-pressure stage turbocharger is concentrically connected to said high-pressure compressor is composed such that
   the high-pressure turbine housing is cast integral with the exhaust manifold and has an exhaust gas outlet side flange,
   the low-pressure turbine housing has a low-pressure turbine mounting flange, and
   the exhaust gas guide member is attached to the high-pressure turbine housing at the exhaust gas outlet side flange and the low-pressure turbine housing at the low-pressure turbine mounting flange.

5. The multistage exhaust turbocharger according to claim 4, wherein a flange face of the exhaust gas outlet side flange of the high-pressure turbine housing is perpendicular to flange faces of flanges of the exhaust manifold for attaching the manifold to the internal combustion engine.

* * * * *